(12) United States Patent
Sugioka et al.

(10) Patent No.: US 10,797,978 B2
(45) Date of Patent: Oct. 6, 2020

(54) COMMUNICATION ADAPTER AND CONNECTION TEST RUN METHOD THEREFOR

(71) Applicant: NORITZ CORPORATION, Hyogo (JP)

(72) Inventors: Masayuki Sugioka, Kusatsu (JP); Yoshihiko Maekawa, Akashi (JP); Daisuke Hirota, Akashi (JP)

(73) Assignee: NORITZ CORPORATION, Hyogo (JP)

(*) Notice: Subject to any disclaimer, the term of this patent is extended or adjusted under 35 U.S.C. 154(b) by 27 days.

(21) Appl. No.: 16/165,489

(22) Filed: Oct. 19, 2018

(65) Prior Publication Data
US 2019/0132227 A1    May 2, 2019

(30) Foreign Application Priority Data

Oct. 26, 2017  (JP) ................................ 2017-206932

(51) Int. Cl.
*H04L 29/06* (2006.01)
*H04L 29/08* (2006.01)
*H04L 12/26* (2006.01)

(52) U.S. Cl.
CPC .......... *H04L 43/0811* (2013.01); *H04L 43/10* (2013.01); *H04L 43/50* (2013.01); *H04L 67/141* (2013.01); *H04L 67/12* (2013.01)

(58) Field of Classification Search
CPC ..... H04L 43/0811; H04L 43/10; H04L 67/12; H04L 43/50

(Continued)

(56) References Cited

U.S. PATENT DOCUMENTS

| | | | |
|---|---|---|---|
| 8,265,780 B2 * | 9/2012 | Sadahira | ............ G05D 23/1905 700/1 |
| 2008/0221713 A1 * | 9/2008 | Sadahira | ............ G05D 23/1905 700/81 |

(Continued)

FOREIGN PATENT DOCUMENTS

| | | |
|---|---|---|
| JP | 2010-038430 A | 2/2010 |
| JP | 5049588 B2 | 10/2012 |
| WO | 2004/098157 A2 | 11/2004 |

OTHER PUBLICATIONS

"Field Performance of Heat Pump Water Heaters in the Northeast"—Shapiro et al, Consortium for Advanced Residential Buildings, U.S. Dept. of Energy, Feb. 2016. https://www.nrel.gov/docs/fy16osti/64904.pdf (Year: 2016).*

*Primary Examiner* — Randy A Scott
(74) *Attorney, Agent, or Firm* — Studebaker & Brackett PC

(57) ABSTRACT

Each hot water supply apparatus of a hot water supply system exchanges information with a management center via a communication adapter, thereby being remotely monitored. In a connection test run for the communication adapter in a remote monitoring system, when a part of transmission information about the hot water supply apparatus is transmitted to the communication adapter via a communication line, establishment of a communication connection to the hot water supply system is indicated, and a heartbeat notification is transmitted from the communication adapter to the management center. When the communication adapter receives a response to the heartbeat notification from the management center, establishment of a communication connection to the management center is indicated.

6 Claims, 6 Drawing Sheets

(58) Field of Classification Search
USPC ...... 700/11, 21, 90, 200; 709/201, 204, 223, 709/224, 230
See application file for complete search history.

(56) References Cited

U.S. PATENT DOCUMENTS

2015/0005978 A1* 1/2015 Nakakita .................. H02J 3/14
700/297
2015/0330650 A1* 11/2015 Abiprojo .................. F24F 11/62
700/276
2015/0345804 A1* 12/2015 Ellingwood .......... F24H 9/2057
700/282

* cited by examiner

COMMUNICATION ADAPTER AND CONNECTION TEST RUN METHOD THEREFOR

BACKGROUND OF THE INVENTION

Field of the Invention

The present disclosure relates to a communication adapter, and more particularly to a connection test run for a communication adapter used in a remote monitoring system for a hot water using facility (such as, for example, a water heater, a multi-water heating system, a reheating system for water in a bath, a filtering apparatus, or a hot water heating apparatus).

Description of the Background Art

A system configured to remotely monitor or manage facility equipment through communication is known. For example, Japanese Patent Laying-Open No. 2010-38430 discloses a remote management system including a plurality of local management apparatuses configured to transmit prescribed data about connected facility equipment, and a central management apparatus configured to receive the prescribed data from the plurality of local management apparatuses through a communication line. Japanese Patent Laying-Open No. 2010-38430 describes a configuration in which, when a configuration of the facility equipment is changed by the update operation or the addition operation, a test run tool is communicatively connected to the local management apparatuses, and updated data and program for remote management about the facility equipment is transmitted from the test run tool to the local management apparatuses and is further transmitted from the local management apparatuses to the central management apparatus.

SUMMARY OF THE INVENTION

A remote monitoring system in which information is exchanged between a hot water using facility and a central management apparatus (such as a server) via a communication adapter requires a connection test run for establishing a communication connection via the communication adapter. An operator of the connection test run attends the connection test run until a notification that a result of communication connection checking is normal is provided. Particularly when the large number of hot water using facilities are connected, it is concerned that it takes a long time to provide a notification of the checking result.

The present disclosure has been made to solve the above-described problem, and an object of the present disclosure is to prevent communication connection checking in a connection test run from being prolonged in a communication adapter used in a remote monitoring system for a hot water using facility.

According to an aspect of the present disclosure, a communication adapter used in a remote monitoring system for a hot water using facility includes first and second communication circuits, first and second indicating devices, and a controller. The first communication circuit exchanges information with the hot water using facility by a first communication connection via a communication line. The second communication circuit exchanges information with a management apparatus of the remote monitoring system by a second communication connection via a communication network. The first indicating device indicates a state of communication connection by the first communication circuit. The second indicating device indicates a state of communication connection by the second communication circuit. The controller controls the first and second communication circuits and the first and second indicating devices. When the controller obtains a part of transmission information through the first communication circuit during a connection test run for the communication adapter, the controller causes the first indicating device to indicate that the first communication connection has been established, and transmits a first heartbeat notification to the management apparatus through the second communication circuit, the transmission information being information about the hot water using facility transmitted to the management apparatus through the connection test run. Furthermore, when a response to the first heartbeat notification is received from the management apparatus, the controller causes the second indicating device to indicate that the second communication connection has been established.

According to the above-described communication adapter, when a part of the transmission information is obtained by the first communication connection, the communication adapter can indicate establishment of the second communication connection between the communication adapter and the management apparatus by communication with the management apparatus using the heartbeat notification. Therefore, even when the transmission information increases in accordance with an increase in the number of the hot water using facilities, establishment of the first and second communication connections can be indicated without waiting for the entire transmission information to be normally transmitted to the management apparatus, and thus, it is possible to prevent communication connection checking in a connection test run from being prolonged.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
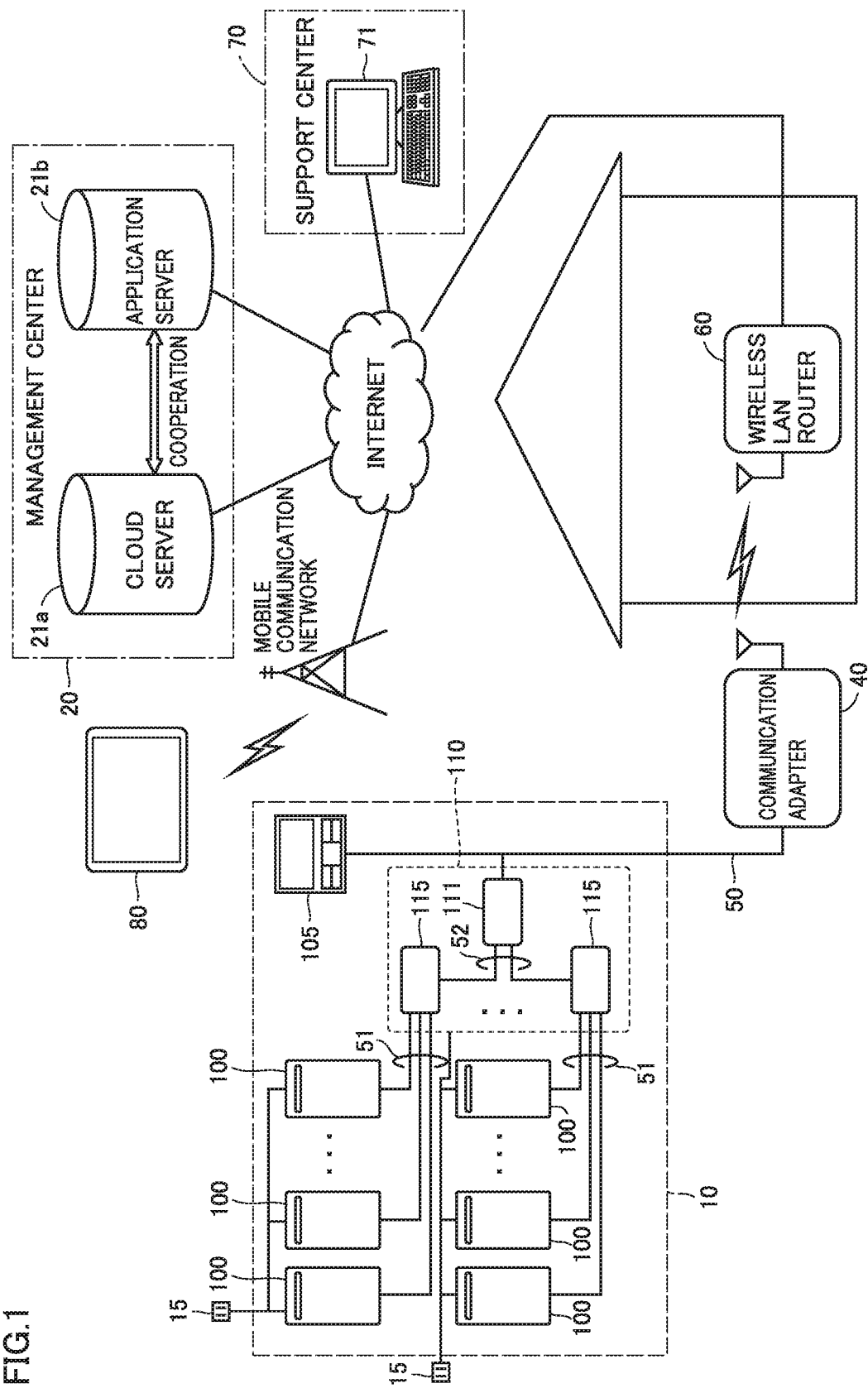
FIG. 1 is a block diagram showing a configuration example of a remote monitoring system for a hot water using facility to which a communication adapter according to the present embodiment is applied.

An embodiment of the present disclosure will be described in detail below with reference to the drawings, in which the same or corresponding portions are denoted by the same reference characters and description thereof will not be repeated in principle.

FIG. 1 is a block diagram showing a configuration example of a remote monitoring system for a hot water using facility to which a communication adapter according to the present embodiment is applied.

Referring to FIG. 1, a hot water supply system 10 includes a hot water supply apparatus 100 that is one example of "hot water using facility", and a remote controller 105 configured to input an operation instruction.

Hot water supply apparatus 100 is, for example, a water heater, and one or a plurality of hot water supply apparatuses 100 is/are arranged. System controllers 115 are preferably arranged to control the plurality of hot water supply apparatuses 100. A maximum of m (m is a predetermined natural number) hot water supply apparatuses 100 can be connected to one system controller 115 by a communication line 51.

In the configuration example in FIG. 1, a parent system controller 111 that integrates the plurality of system controllers 115 is arranged, and parent system controller 111 and each system controller 115 are connected by a communication line 52. In addition, parent system controller 111 is connected to remote controller 105 and a communication adapter 40 by a communication line 50. In the following description, an aggregate of parent system controller 111 and system controllers 115 will also be collectively referred to as "system controller 110". A configuration of system controller 110 is arbitrary and is not limited to a hierarchical structure of parent system controller 111 and system controllers 115. System controller 110 may be configured by one or a plurality of system controllers 115.

For example, communication adapter 40 can be placed outside, e.g., in the vicinity of an outer wall of a house, in a garage and the like, together with hot water supply apparatuses 100. Communication adapter 40 has the wireless communication function for communicating with a wireless LAN (Local Area Network) router 60 arranged inside in accordance with a prescribed communication protocol (such as, for example, IEEE 802.11n). For a communication connection to the Internet network (communication network), communication adapter 40 may be configured to communicate with a wired LAN router (not shown) in accordance with a prescribed communication protocol (such as, for example, IEEE 802.3 of the Ethernet standards), instead of communication with wireless LAN router 60. The details of communication adapter 40 will be described later.

Wireless LAN router 60 is connected to the Internet network (communication network). Wireless LAN router 60 can also function as a wireless LAN master unit so as to wirelessly connect a plurality of wireless LAN slave units. Communication adapter 40 can operate as a wireless LAN slave unit, and can be connected to the Internet via wireless LAN router 60 when a communication connection (wireless link) to wireless LAN router 60 is established.

Connection by communication lines 50 to 52 allows each hot water supply apparatus 100 to bidirectionally receive and transmit data from and to each of remote controller 105 and communication adapter 40 via system controller 110. Data can also be bidirectionally exchanged between remote controller 105 and communication adapter 40.

Since remote controller 105 is connected to the plurality of hot water supply apparatuses 100 via system controller 110, the operation of the plurality of hot water supply apparatuses 100 connected to system controller 110 can be controlled by common remote controller 105.

Two-wire communication lines can, for example, be used as communication lines 50 to 52. Hereinafter, communication lines 50 to 52 will also be referred to as "two-wire communication lines 50 to 52". System controller 110 is configured to convert electric power supplied from an external power source 15 such as a commercial system into a power source voltage for an external apparatus and output the power source voltage to two-wire communication line 50, and thus, the operating power of remote controller 105 and communication adapter 40 can be supplied from system controller 110. In this case, the communication data can be superimposed on the power source voltage in two-wire communication lines 50 to 52.

Furthermore, in the remote monitoring system for the hot water using facility according to the present embodiment, a management center 20 and a support center 70 are connected to the communication network (typically, the Internet). Management center 20 includes a cloud server 21a and an application server 21b. Cloud server 21a and application server 21b are connected to be communicable with each other via the Internet network or a dedicated line, and can provide various services in cooperation with each other. Management center 20 corresponds to one example of "management apparatus".

Figure 2:
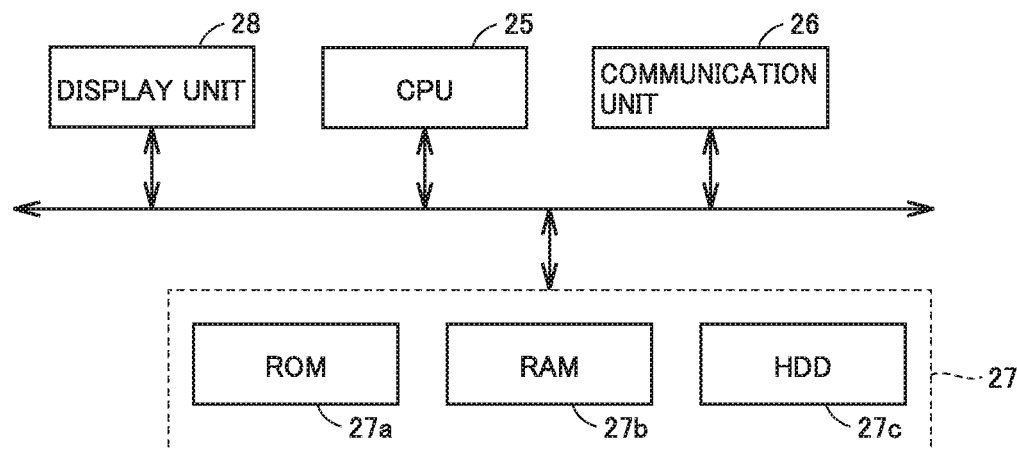
FIG. 2 is a schematic configuration diagram of a server device forming a cloud server and an application server shown in FIG. 1.

FIG. 2 is a schematic configuration diagram of a server device 21 forming cloud server 21a and application server 21b.

Referring to FIG. 2, server device 21 includes a CPU (Central Processing Unit) 25 configured to control the entire device, a communication unit 26 and a memory 27 connected to CPU 25, and a display unit 28. Communication unit 26 has the function of communicating with another apparatus or server by communication connected to the communication network (Internet). Display unit 28 is configured by a display screen.

Memory 27 includes, for example, a ROM (Read Only Memory) 27a that is a memory configured to store a program executed on CPU 25, a RAM (Random Access Memory) 27b that is a memory configured to serve as a work area when executing the program on CPU 25 or store a calculated value, and an HDD (Hard Disk Drive) 27c that is one example of a large-size storage device.

Server device 21 can be configured to have the function corresponding to a general computer. Server device 21 may further include an operation unit configured to accept an operation input.

Referring again to FIG. 1, multiple communication adapters 40 placed in households, accommodations and the like are constantly connected to cloud server 21a and cloud server 21a communicates with these communication adapters 40, whereby cloud server 21a mainly collects and manages various pieces of information about hot water supply systems 10 of the respective customers such as the households, the accommodations and the like. For example, the collected information can include a unit time-based amount of supplied hot water and a unit time-based amount of fuel consumption, a temperature of supplied hot water, the error information occurring in each hot water supply system 10, and the like.

Application server 21b manages multiple user accounts for multiple users in the respective households, the respective accommodations and the like, and accepts a login from an operation terminal such as a smartphone (not shown) owned by each user and provides various services to the operation terminal owned by each user.

Preferably, dedicated application software for using the services provided by application server 21b is installed onto the smartphone, such that the login operation and various operations after login can be performed using this application software. Alternatively, the services may also be provided on a Web basis, such that the login operation and the other operations can be performed using the appropriate Web browser.

Application server 21b can also be configured such that application server 21b provides only an application service for the user terminal such as the smartphone and the customer information including the user accounts is managed by another customer information management center. Alternatively, cloud server 21a and application server 21b may be configured by an integrated server device.

The services provided by cloud server 21a and application server 21b can be appropriately designed as needed. For example, the connected apparatus checking service, the operation information collecting and managing service, the error monitoring service, the maintenance monitoring service, the remote operation service and the like can be provided.

In accordance with the connected apparatus checking service, the apparatus type and the system configuration of hot water supply apparatus 100 of hot water supply system 10 connected to communication adapter 40 can be checked. Based on the information collected from hot water supply system 10 by communication adapter 40, the apparatus type and the system configuration can be determined on the server side.

In accordance with the operation information collecting and managing service, the operation information about hot water supply system 10 can be periodically collected from communication adapter 40 and managed every unit time (e.g., every one hour). Although the collected operation information is arbitrary, a unit time-based cumulative amount of supplied hot water or a unit time-based cumulative amount of fuel consumption can, for example, be collected. The collected operation information can also be used to create development materials based on big data analysis.

In accordance with the error monitoring service, when an error occurs in hot water supply system 10, the information about the error can be obtained from communication adapter 40 and notification of the error can be provided to a terminal 71 of support center 70 or an e-mail address of the user.

In accordance with the maintenance monitoring service, the operating condition of hot water supply system 10 can be monitored in real time at the time of repair of hot water supply system 10 and the like. Specifically, the operating condition of hot water supply system 10 connected to specified communication adapter 40 can be monitored in real time on a tablet terminal 80 and the like of an on-site operator communicatively connected to cloud server 21a.

Furthermore, in the remote monitoring system for the hot water using facility according to the present embodiment, the remote operation service for hot water supply system 10 can also be provided. For example, a prescribed operation of hot water supply system 10, such as, for example, an operation for switching on and off the hot water supply operation and an operation for changing the hot water supply set temperature, can be performed via the communication network (Internet), using terminal 71 of support center 70, tablet terminal 80 of the on-site operator, and the smartphone (not shown) owned by the user, and the like. In this case, the remote operation by the user can be performed by logging in to application server 21b from the smartphone (not shown) and the like. In addition, as a part of the services in the remote monitoring system, the operation information collected from communication adapter 40 can also be displayed to be viewable on the smartphone (not shown) and the like in the logged-in state.

The above-described remote monitoring service can be provided by data communication between management center 20 (hereinafter, also simply referred to as "server 20") and hot water supply system 10 via communication adapter 40.

Figure 3:
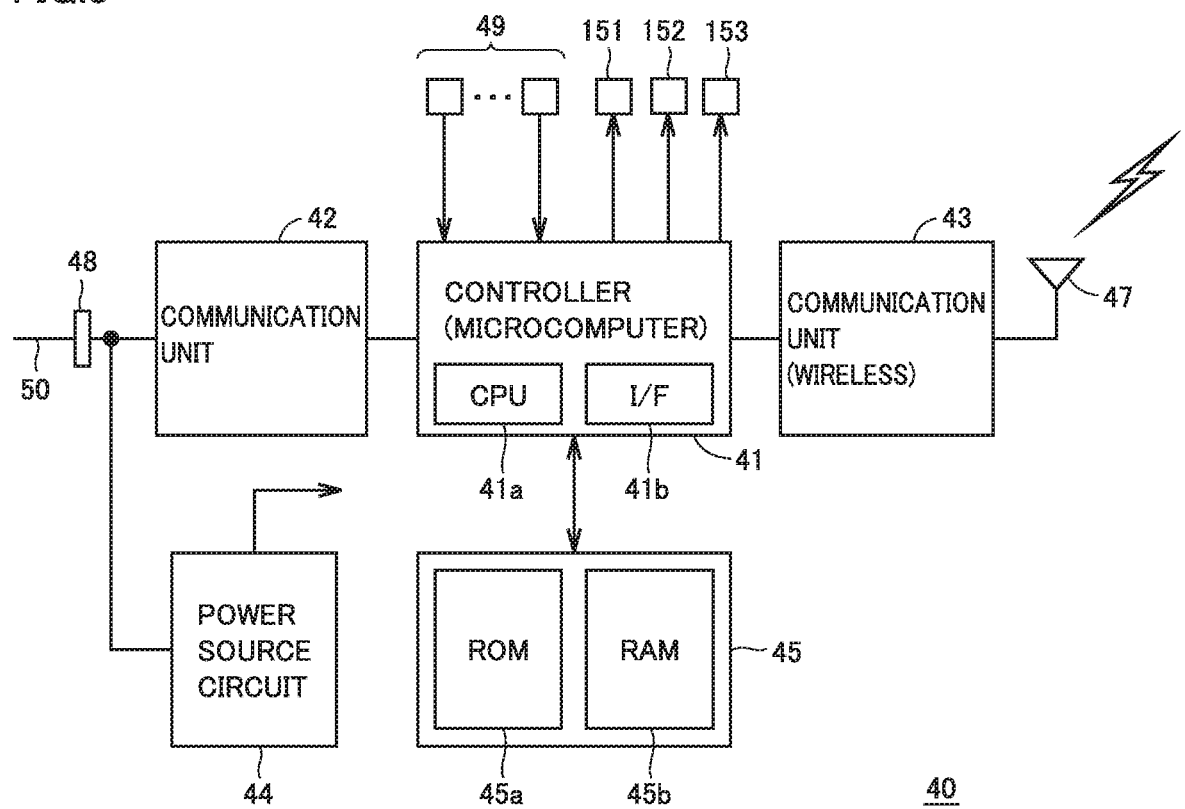
FIG. 3 is a block diagram showing a configuration example of the communication adapter shown in FIG. 1.

FIG. 3 is a block diagram showing a configuration example of communication adapter 40.

Referring to FIG. 3, communication adapter 40 includes a controller 41, communication units (circuits) 42 and 43, a power source circuit 44, a memory 45, an antenna 47, a connector 48, a manual switch 49, and indicating units 151 to 153. Communication line 50 (two-wire communication line) shown in FIG. 1 is connected to connector 48.

Controller 41 can be configured by a microcomputer including a CPU 41a and an interface (I/F) 41b. Communication unit 42 is configured to be able to bidirectionally receive and transmit data from and to and thereby exchange information with system controller 110 and remote controller 105 via two-wire communication line 50 connected to connector 48. Communication unit 43 is configured to be able to bidirectionally receive and transmit data from and to and thereby exchange information with wireless LAN router 60 and the smartphone (not shown) by wireless communication via antenna 47. Power source circuit 44 is supplied with electric power from two-wire communication line 50 connected to connector 48 and generates an operating power source voltage for each component in communication adapter 40.

Memory 45 has a ROM 45a and a RAM 45b. For example, a program for controlling the operation of communication adapter 40 is stored in ROM 45a, and at the time of the startup process, controller 41 reads the program stored in ROM 45a and loads the program into RAM 45b. In the following description, controller 41 executes the program loaded into RAM 45b and controls the operation of communication adapter 40. Although memory 45 and controller 41 are shown as separate components in FIG. 3, a part or all of memory 45 can also be built into controller 41. Similarly, at least a part of controller 41, communication unit 42 and communication unit 43 can be formed integrally.

Manual switch 49 is operated by the user, the operator or the like. In response to the operation of manual switch 49, a prescribed electric signal is input from manual switch 49 to controller 41. Thus, controller 41 can detect the operation of manual switch 49.

Using communication unit 43, communication adapter 40 can communicate with communication unit 26 of management center 20 via the communication network (Internet). In the remote monitoring system for the hot water using facility according to the present embodiment, remote monitoring is implemented by data communication between hot water supply apparatuses 100 and server 20 using communication adapter 40. Therefore, during construction of hot water supply system 10, a connection test run is performed to check whether or not a communication connection between hot water supply system 10 and server 20 using communication adapter 40 is established.

In the connection test run for the remote monitoring system shown in FIG. 1, it is necessary to check a communication connection by communication unit 42 via two-wire communication line 50 (hereinafter, also referred to as "system connection"), and a communication connection to server 20 by communication unit 43 via the communication network (Internet) (hereinafter, also referred to as "server connection"). That is, communication unit 42 corresponds to "first communication circuit", and communication unit 43 corresponds to "second communication circuit". Communication units 42 and 43 can be configured separately or integrally.

Furthermore, in the configuration example in FIG. 1, communication adapter 40 is connected to the server via wireless LAN router 60, and thus, it is also necessary to check a communication connection between communication adapter 40 and wireless LAN router 60 (hereinafter, also referred to as "LAN connection") as a part of the server connection. Therefore, in the connection test run, the operator needs to check that the above-described three communication connections are established.

Figure 4:
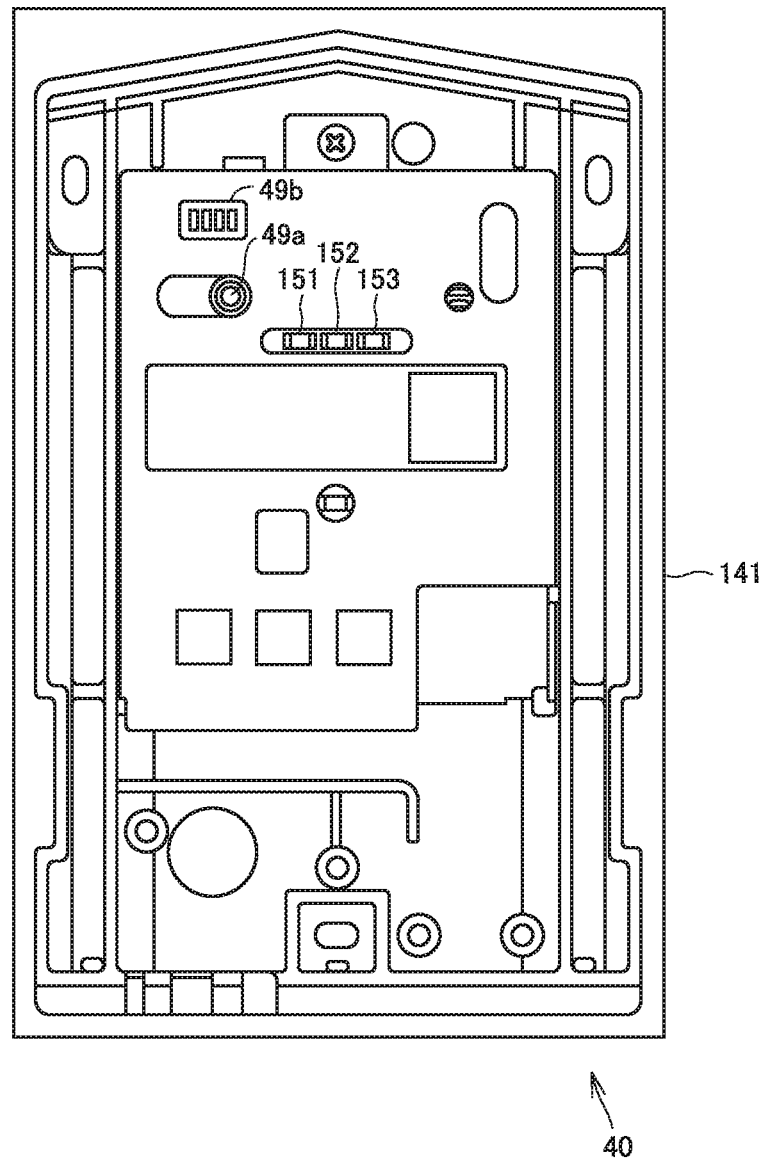
FIG. 4 is a schematic diagram illustrating a display example of a result of a connection test run in the communication adapter.

FIG. 4 is a schematic view illustrating a display example of a result of the connection test run in communication adapter 40. FIG. 4 shows one example of a front view when a lid of a housing of communication adapter 40 is opened.

Referring to FIG. 4, a control panel of communication adapter 40 is housed in a housing 141 provided with a not-shown lid. A push switch 49a, a DIP switch 49b and the like are provided on a surface of the control panel as manual switch 49 (FIG. 3). Furthermore, indicating units 151 to 153 shown in FIG. 3 are arranged on the control panel. Indicating units 151 to 153 are provided to indicate a state of communication connection. For example, when indicating units 151 to 153 are configured by LEDs (Light Emitting Diodes), each LED is turned on, such that establishment of each communication connection can be visually indicated and a result of the connection test run can be visually indicated. Hereinafter, indicating units 151 to 153 will also be referred to as "LEDs 151 to 153".

For example, LED 151 is turned on when the system connection is established, LED 152 is turned on when the LAN connection is established, and LED 153 is turned on when the server connection is established. That is, of LEDs 151 to 153, LED 151 corresponds to "first indicating device", and LED 153 corresponds to "second indicating device". When LEDs 151 to 153 are all turned on in the connection test run, communication connection checking can be completed. That is, the system connection corresponds to "first communication connection", and the server connection corresponds to "second communication connection". In the configuration example in FIG. 1, the LAN connection needs to be established as a precondition for the server connection.

Each of indicating units 151 to 153 may be configured to indicate a state of each communication connection by the means other than the visual means. For example, each of indicating units 151 to 153 may be configured to vocally indicate establishment of each communication connection during the connection test run.

Figure 5:
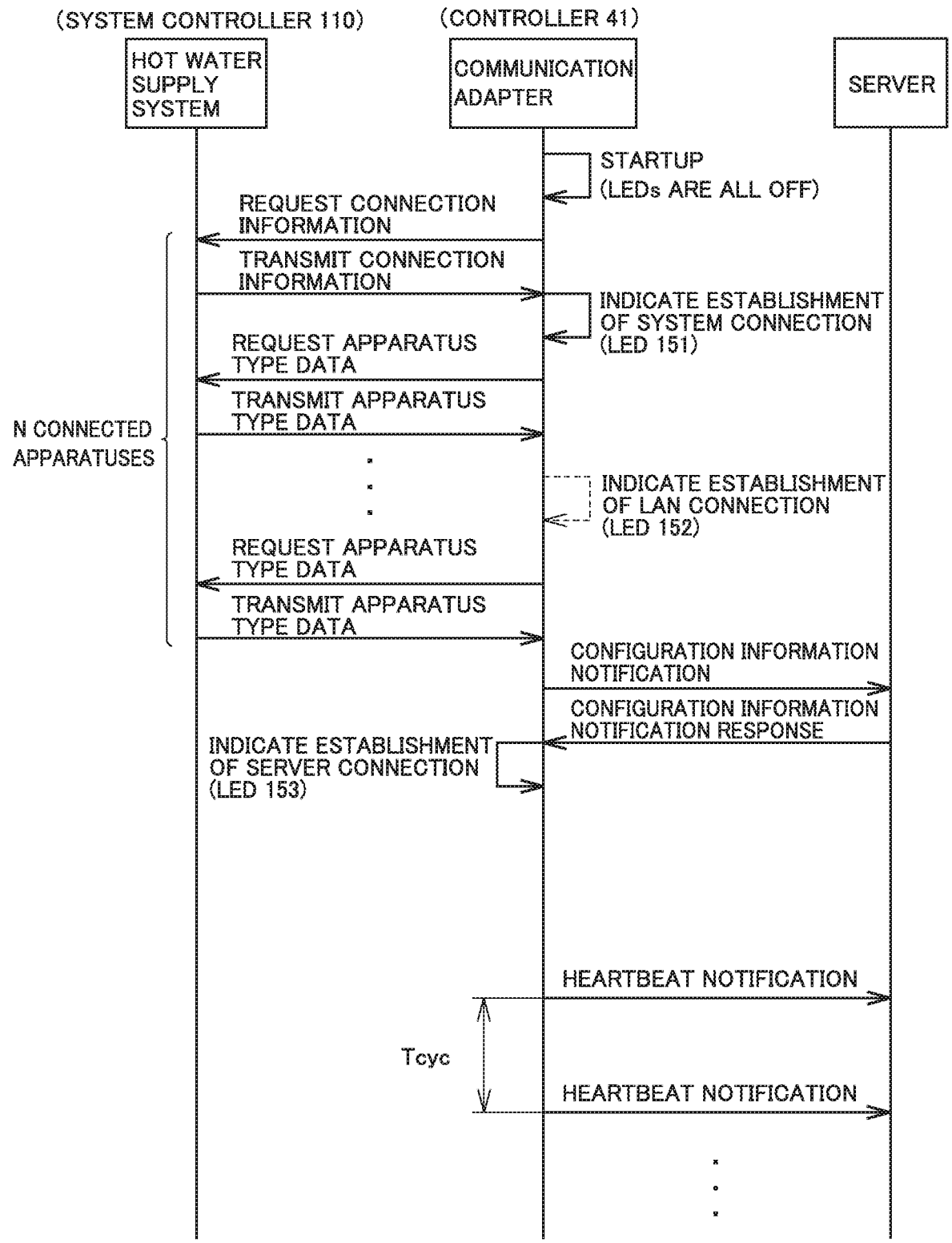
FIG. 5 is a sequence diagram illustrating a process flow of a connection test run according to a comparative example.

FIG. 5 is a sequence diagram illustrating a process flow of a connection test run according to a comparative example.

Referring to FIG. 5, at the time of startup of the connection test run, LEDs 151 to 153 are off. For example, the connection test run can be automatically started up when a power supply to communication adapter 40 is switched from a stop state to a supply state (e.g., when two-wire communication line 50 is connected to connector 48). Alternatively, in a state where the power is being supplied to communication adapter 40, the connection test run may be started up in response to a prescribed operation performed on manual switch 49.

When the connection test run is started up, controller 41 of communication adapter 40 requests connection information from system controller 110 of hot water supply system 10. The connection information forms a part of information that needs to be transmitted from hot water supply system 10 to server 20 during the connection test run (hereinafter, also referred to as "transmission information"). For example, the connection information includes information about the total number (N) of hot water supply apparatuses 100, system controllers 111 and 115, and remote controller 105 in hot water supply system 10. Hereinafter, hot water supply apparatuses 100, system controllers 111 and 115, and remote controller 105 are also collectively referred to as "connected apparatuses". Alternatively, the connection information has information indicating the number of the connected apparatuses and a hierarchical structure of connection of the connected apparatuses. In the following description, the number of the connected apparatuses in hot water supply system 10 as a whole is N in total (N is an integer equal to or greater than 2).

System controller 111 outputs the connection information based on a connection situation of hot water supply apparatuses 100 and system controllers 115. The connection information is transmitted from system controller 111 to communication adapter 40 by communication via two-wire communication line 50.

Controller 41 determines whether or not obtainment of the requested connection information has been completed. This determination can be performed based on a signal received from system controller 111. When obtainment of the connection information has been completed, controller 41 confirms that the system connection via two-wire communication line 50 is established, and turns on, for example, LED 151 (FIG. 4) to indicate establishment of the system connection.

Based on the obtained connection information, controller 41 sequentially requests apparatus type data about each of hot water supply apparatuses 100, system controllers 111 and 115, and remote controller 105 (connected apparatuses) from hot water supply system 10. Similarly to the connection information, the apparatus type data is also transmitted from system controller 111 to communication unit 42 via two-wire communication line 50. The apparatus type data includes, for example, an apparatus type name of each connected apparatus, a version of a control program, an apparatus type code, an individual identification number and the like. Controller 41 continues communication with system controller 110 until obtainment of the apparatus type data about all of the N connected apparatuses indicated by the connection information is completed.

Separately from communication with system controller 110, it can be determined whether or not communication adapter 40 has been connected to wireless LAN router 60. The process of connection to wireless LAN router 60 is performed by the operator or the like of the connection test run inputting a predetermined password or operating the push switch, separately from reception and transmission from and to hot water supply system 10. The process of connection to wireless LAN router 60 can be performed using, for example, the WPS (Wi-Fi Protected Setup) function.

When connection to wireless LAN router 60 has been completed, controller 41 confirms that the LAN connection is established, and turns on, for example, LED 152 (FIG. 4) to indicate establishment of the LAN connection. When the communication connection to wireless LAN router 60 is established, communication adapter 40 can communicate with server 20 via the communication network (Internet).

When obtainment of the apparatus type data about all of the N connected apparatuses has been completed after establishment of the LAN connection, controller 41 transmits configuration information about the N connected apparatuses to server 20. The configuration information includes the above-described connection information and apparatus type data.

When server 20 normally receives the configuration information from communication adapter 40, server 20 transmits a notification response to communication adapter 40. In response to reception of the notification response from server 20, communication adapter 40 confirms that the server connection is established, and turns on, for example, LED 153 (FIG. 4) to indicate establishment of the server connection.

Communication adapter 40 operates to perform periodic heartbeat communication with management center 20 when a certain period of time elapses from the end of the last communication with server 20. Therefore, after the server connection is established, a heartbeat notification is transmitted from communication adapter 40 to server 20 at a certain cycle Tcyc (e.g., approximately 3 to 5 minutes). As a result, even when data transmission from communication adapter 40 to server 20 is not performed for a long period of time, server 20 can confirm that communication with communication adapter 40 is established.

LEDs 151 to 153 are turned on as a result of the process in FIG. 5, and thus, communication connection checking in the connection test run is completed. In other words, the operator needs to attend the connection test run until LEDs 151 to 153 are all turned on. Therefore, in the case of the large-capacity apparatus type data, it is concerned, for example, that the operator must attend the connection test run for a longer period of time as the number of connected hot water supply apparatuses 100 in hot water supply system 10 shown in FIG. 1 becomes larger. As described above, establishment of the LAN connection is a precondition for establishment of the server connection, and thus, by indicating establishment of the server connection, establishment of the LAN connection can be indirectly indicated. Therefore, arrangement and turn-on of LED 152 (FIG. 4) denoted by the dotted line can be omitted. On the other hand, indication by LED 152 makes it possible to, when the server connection is not established, easily check whether or not the LAN connection is a cause thereof.

Particularly, the number of hot water supply apparatuses 100, remote controllers 105 and system controllers 110 placed in hot water supply system 10 varies from placement site to placement site. Therefore, in the connection test run according to the comparative example, it is concerned that the time required from the start of the connection test run to indication of establishment of the server connection varies greatly from placement site to placement site.

Therefore, in the remote monitoring system according to the present embodiment, the connection test run is performed such that the time required until confirmation of establishment of the connection is not prolonged even when the number (N) of the connected apparatuses such as hot water supply apparatuses 100 in hot water supply system 10 increases.

Figure 6:
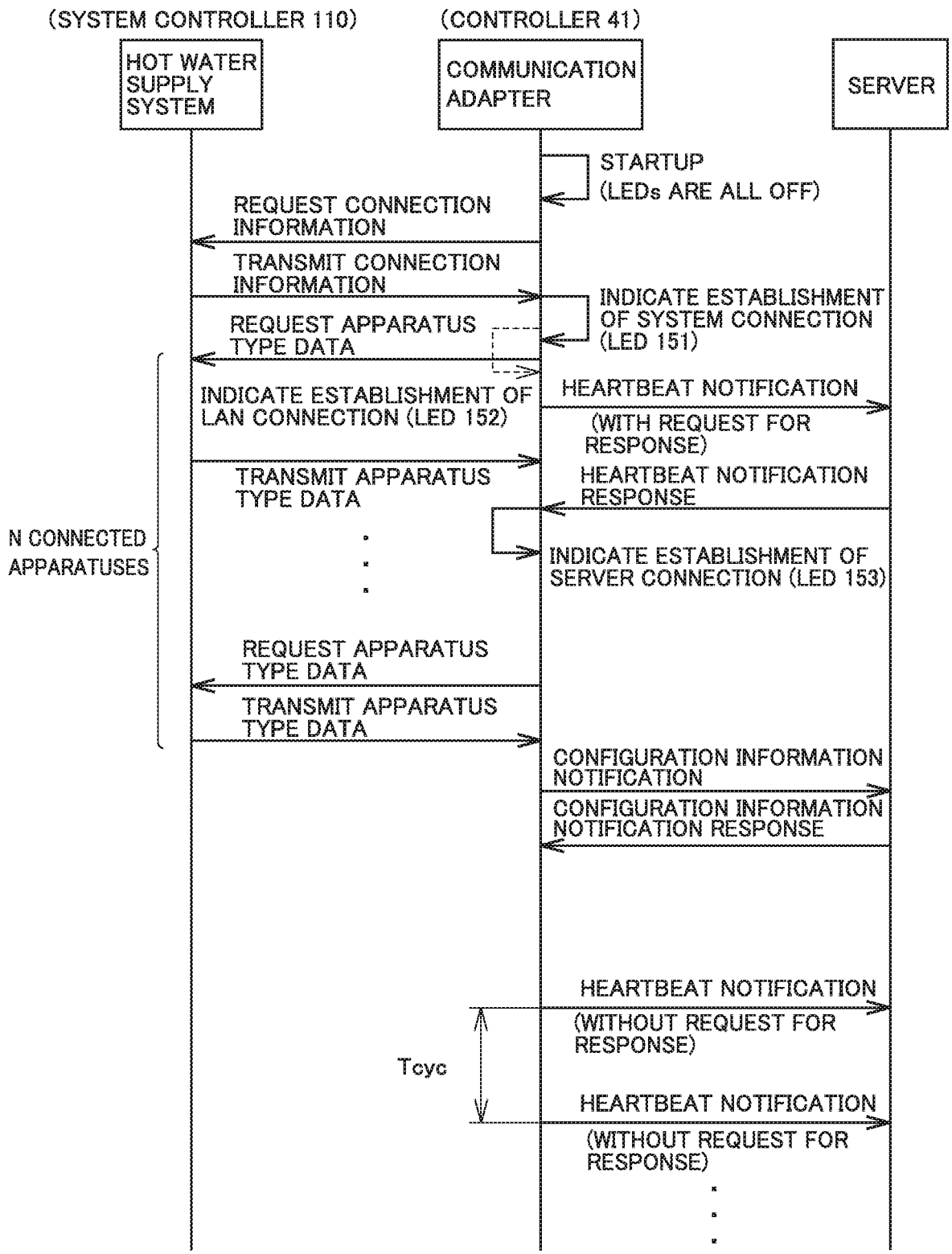
FIG. 6 is a sequence diagram illustrating a process flow of the connection test run in the communication adapter according to the present embodiment.

FIG. 6 is a sequence diagram illustrating a process flow of the connection test run in the communication adapter according to the present embodiment.

Referring to FIG. 6, similarly to the comparative example in FIG. 5, when the connection test run is started up, controller 41 obtains connection information from system controller 110. Furthermore, in response to obtainment of the connection information, controller 41 confirms that the system connection is established, and turns on LED 151 from the off state of all of LEDs 151 to 153 to indicate establishment of the system connection.

Furthermore, similarly to the comparative example in FIG. 5, controller 41 determines whether or not communication adapter 40 has been connected to wireless LAN router 60, separately from communication with system controller 110. When connection to wireless LAN router 60 has been completed, controller 41 confirms that the LAN connection is established, and turns on, for example, LED 152 (FIG. 4) to indicate establishment of the LAN connection. Similarly to FIG. 5, arrangement and turn-on of LED 152 can be omitted.

Similarly to the comparative example in FIG. 5, based on the obtained connection information, controller 41 sequentially obtains apparatus type data about each of the N connected apparatuses in hot water supply system 10 from system controller 110.

When establishment of the system connection and the LAN connection is confirmed, controller 41 transmits a heartbeat notification to server 20, without waiting for obtainment of the apparatus type data about all of the N connected apparatuses as in the comparative example. The heartbeat notification in this case requests a response by a reply from server 20 ("with a request for a response").

Generally, a fee for communication with a server is not charged in the case of inbound communication (communication received by the server), whereas the communication fee is charged in the case of outbound communication (communication transmitted by the server). Therefore, in order to reduce the communication fee, the heartbeat notification from communication adapter 40 does not normally request a response by a reply from server 20 ("without a request for a response").

When server 20 normally receives the heartbeat notification ("with a request for a response") from communication adapter 40, server 20 transmits a heartbeat notification response to communication adapter 40. In response to reception of the heartbeat notification response from server 20, communication adapter 40 confirms that the server connection is established, and turns on, for example, LED 153 (FIG. 4) to indicate establishment of the server connection. At this stage, LEDs 151 to 153 are on.

Obtainment of the apparatus type data about the N connected apparatuses by controller 41 is performed separately from communication between communication adapter 40 and server 20.

Similarly to the comparative example, when obtainment of the apparatus type data about all of the N connected apparatuses has been completed, controller 41 transmits configuration information about the N connected apparatuses to server 20. When server 20 normally receives the configuration information from communication adapter 40, server 20 transmits a notification response to communication adapter 40. After that, a heartbeat notification (without a request for a response) is transmitted from communication adapter 40 to server 20 at a certain cycle Tcyc (e.g., approximately 3 to 5 minutes).

Display unit 28 of server 20 or terminal 71 of support center 70 can provide a display about hot water supply system 10 in which the communication connection has been established. The display contents are different between when establishment of the server connection is confirmed and when transmission of the configuration information to server 20 is completed. That is, when establishment of the server connection is confirmed, a display about the apparatus type data cannot be provided, and thus, establishment of connection to communication adapter 40 is only displayed. On the other hand, after transmission of the entire transmission information to server 20 is completed, the information about the apparatus type data can be displayed on display unit 28 or the like.

As described above, in the connection test run according to the present embodiment, establishment of the system connection, the LAN connection and the server connection can be indicated before the configuration information about the N connected apparatuses is obtained and transmission of the configuration information to server 20 is completed.

The time required for obtainment and transmission of the configuration information increases in accordance with an increase in the number (N) of the connected apparatuses. However, according to the connection test run in FIG. 6, even when the number of the hot water using facilities (connected apparatuses) in hot water supply system 10 increases, the time required until confirmation of the communication connection in the connection test run, i.e., the time for the operator to attend the connection test run, can be shortened. In addition, variations in the time required until confirmation of the communication connection in the connection test run among the placement sites of hot water supply system 10 as described above can also be suppressed. Furthermore, an increase in communication fee can be suppressed because the response to the heartbeat notification is requested only before establishment of the server connection is confirmed.

As to transmission of the configuration information, the configuration information about all of the N connected apparatuses may be collectively transmitted to server 20, or the obtained configuration information may be divided into pieces and the divided pieces of the configuration information may be transmitted to server 20 after establishment of the server connection is confirmed. Regardless of whether the configuration information is transmitted collectively or in a divided manner, the connection test run is performed until the configuration information about the N connected apparatuses is transmitted to server 20.

Figure 7:
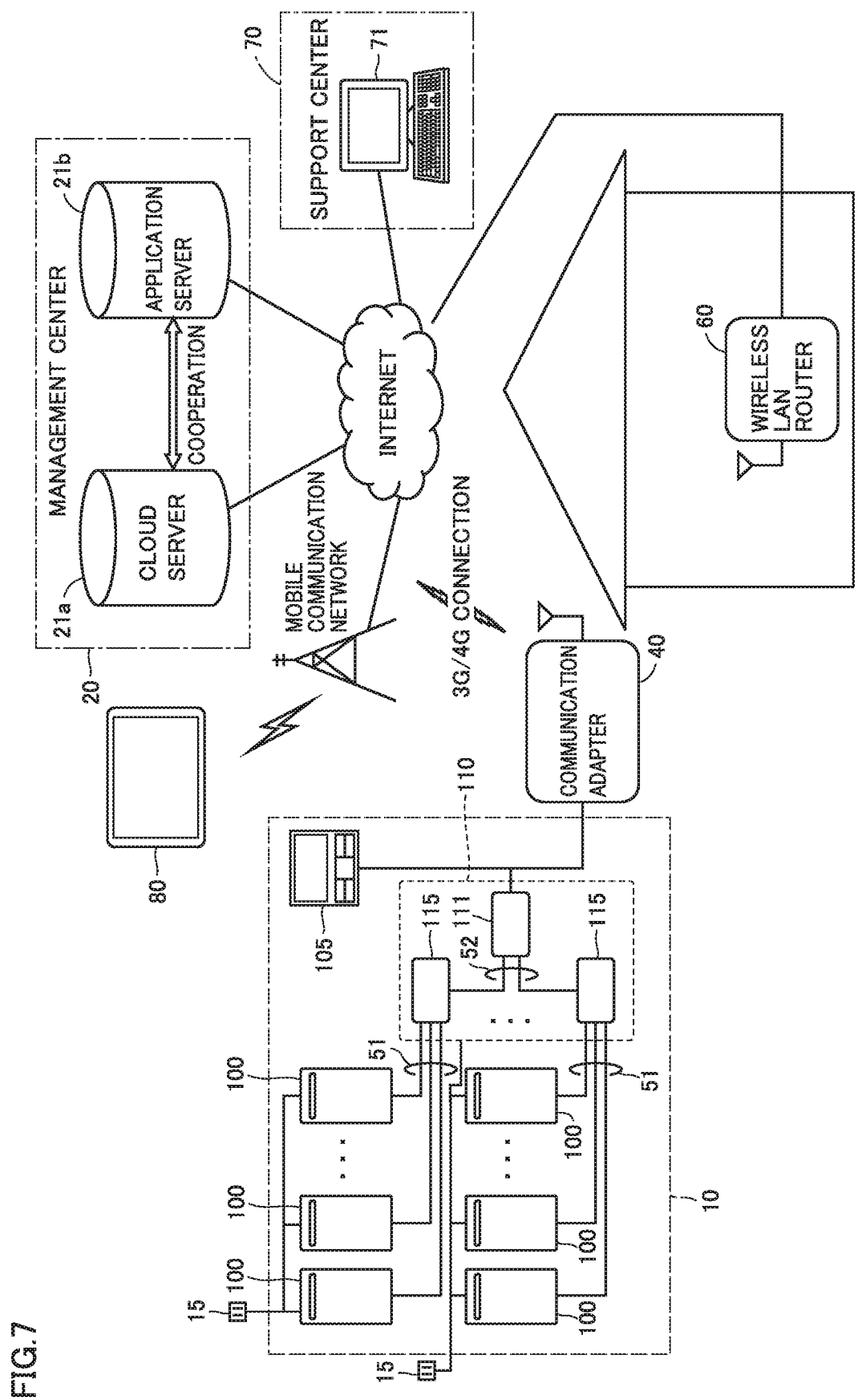
FIG. 7 is a block diagram illustrating a modification of the remote monitoring system to which a communication adapter according to a modification of the present embodiment is applied.

FIG. 7 is a block diagram illustrating a modification of the remote monitoring system to which a communication adapter according to a modification of the present embodiment is applied.

Referring to FIG. 7, in the modification of the present embodiment, communication adapter 40 can use the mobile communication network (e.g., 3G line or 4G line) to directly receive and transmit the communication data from and to server 20 via the communication network, not via wireless LAN router 60. Therefore, in the configuration in FIG. 7, communication unit 43 is configured to include, for example, a 3G router (not shown). That is, the 3G router functions as "second communication circuit".

In the configuration example in FIG. 7, connection to the 3G router can be implemented by wired connection. Therefore, communication between communication adapter 40 and server 20 can be performed without requiring wireless LAN connection to wireless LAN router 60. Thus, there is no need to check whether or not the LAN connection is established in the connection test run.

Therefore, also in the connection test run for communication adapter 40 applied to the configuration example in FIG. 7, the process of indicating establishment of the LAN connection (turning on LED 152) can be omitted from the control process in FIG. 6, and arrangement of LED 152 configured to indicate establishment of the LAN connection can be omitted from the configuration example in FIG. 4. In the connection test run, LED 151 (system connection) and LED 153 (server connection) are turned on, such that checking of establishment of the communication connections can be completed.

FIGS. 1 and 7 show, by way of example, the configuration in which hot water supply apparatuses 100 are connected to communication adapter 40 via system controller 110 for centralized control of the plurality of hot water supply apparatuses 100. However, the present disclosure is also applicable to a configuration in which system controller 110 is not arranged. In this case, data communication via a communication line (e.g., two-wire communication line) is performed between a not-shown controller of each hot water supply apparatus 100 and communication adapter 40. Therefore, in the connection test run, the connection information is transmitted from all of hot water supply apparatuses 100 to communication adapter 40, and thus, establishment of the system connection is confirmed.

In the case of hot water supply system 10 including the plurality of hot water supply apparatuses 100 without arranging system controller 110, one hot water supply apparatus 100 can be used as a master apparatus and information (including the transmission information in the connection test run) about all of hot water supply apparatuses 100 can be transmitted to communication adapter 40 via the master apparatus.

Furthermore, in the connection test run according to the present embodiment, as an example of a part of the transmission information in the connection test run, establishment of the system connection is indicated and the server connection is verified using heartbeat communication with server 20, when the connection information is obtained by communication adapter 40. However, heartbeat communication with server 20 can be performed in response to obtainment of arbitrary information (data) by communication adapter 40, as long as the information is a part of the transmission information.

Although the embodiment of the present disclosure has been described, it should be understood that the embodiment disclosed herein is illustrative and not limitative in any respect. The scope of the present disclosure is defined by the terms of the claims, and is intended to include any modifications within the scope and meaning equivalent to the terms of the claims.

What is claimed is:

1. A communication adapter used in a remote monitoring system for a hot water using facility, the communication adapter comprising:
    a first communication circuit to exchange information with the hot water using facility by a first communication connection via a communication line;
    a second communication circuit to exchange information with a management apparatus of the remote monitoring system by a second communication connection via a communication network;
    a first indicating device to indicate whether the first communication connection is established;
    a second indicating device to indicate whether the second communication connection is established; and
    a controller to control the first and second communication circuits and the first and second indicating devices, wherein
    when the controller obtains a part of transmission information through the first communication circuit during a connection test run for the communication adapter, the controller causing the first indicating device to indicate that the first communication connection has been established, and transmitting a first heartbeat notification to the management apparatus through the second communication circuit for establishing a second communication connection, in response to the establishment of the first communication connection, the transmission information being information about the hot water using facility transmitted to the management apparatus through the connection test run, when a response to the first heartbeat notification is received from the management apparatus, the controller causing the second indicating device to indicate that the second communication connection has been established, the controller separately generates a first output request to the hot water using facility for the part of the transmission information, and a second output request to the hot water using facility for a remainder of the transmission information, the second output request is generated after the controller obtains the part of the transmission information in response to the first output request, and the controller transmits the obtained remainder of the transmission information to the management apparatus in response to the second output request, after the second communication connection is established.

2. The communication adapter according to claim 1, wherein after the second communication connection is established, the second communication circuit periodically transmits a second heartbeat notification to the management apparatus, and the first heartbeat notification requests the response from the management apparatus, whereas the second heartbeat notification does not request the response from the management apparatus.

3. The communication adapter according to claim 1, wherein the first communication circuit is connected, by the communication line, to a system controller for centralized control of a plurality of the hot water using facilities, and through the connection test run, the transmission information about the plurality of hot water using facilities is output from the system controller to the communication line.

4. The communication adapter according to claim 2, wherein the first communication circuit is connected, by the communication line, to a system controller for centralized control of a plurality of the hot water using facilities, and through the connection test run, the transmission information about the plurality of hot water using facilities is output from the system controller to the communication line.

5. A connection test run method for a communication adapter used in a remote monitoring system for a hot water using facility, the connection test run method comprising:

making, after startup of a connection test run, a first request for a part of transmission information from the communication adapter to the hot water using facility by a first communication connection via a communication line, the transmission information being information about the hot water using facility transmitted to a management apparatus of the remote monitoring system;

indicating, when the part of the transmission information is transmitted from the hot water using facility to the communication adapter in response to the making the request, that the first communication connection has been established;

transmitting, when the part of the transmission information is transmitted from the hot water using facility to the communication adapter in response to the making the request, a first heartbeat notification from the communication adapter to the management apparatus for establishing a second communication connection via a communication network, in response to the establishment of the first communication connection;

indicating, when the communication adapter receives a response to the first heartbeat notification from the management apparatus, that the second communication connection has been established;

making a second request for a remainder of the transmission information from the communication adapter to the hot water using facility transmitted by the first communication connection, after the part of the transmission information is obtained; and transmitting, after the second communication connection is established, the obtained remainder of the transmission information from the communication adapter to the management apparatus by the second communication connection.

6. The connection test run method for the communication adapter according to claim 5, further comprising periodically transmitting, after the second communication connection is established, a second heartbeat notification from the communication adapter to the management apparatus, wherein the first heartbeat notification requests the response from the management apparatus, whereas the second heartbeat notification does not request the response from the management apparatus.

* * * * *